United States Patent
Wadolkowski et al.

(10) Patent No.: US 10,640,196 B1
(45) Date of Patent: May 5, 2020

(54) AIRCRAFT BLADE SEAL

(71) Applicants: Krzysztof H. Wadolkowski, Poway, CA (US); Maurice E. Walker, San Diego, CA (US); Peter A. Soberon, Escondido, CA (US); Daniel S. Gardner, San Diego, CA (US); Jacob D. Nelson, Cardiff, CA (US); Jeremy M. Nelson, Escondido, CA (US)

(72) Inventors: Krzysztof H. Wadolkowski, Poway, CA (US); Maurice E. Walker, San Diego, CA (US); Peter A. Soberon, Escondido, CA (US); Daniel S. Gardner, San Diego, CA (US); Jacob D. Nelson, Cardiff, CA (US); Jeremy M. Nelson, Escondido, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 309 days.

(21) Appl. No.: 15/695,790

(22) Filed: Sep. 5, 2017

(51) Int. Cl.
*B64C 9/02* (2006.01)
*B64C 9/14* (2006.01)
*B64C 9/00* (2006.01)

(52) U.S. Cl.
CPC .............. *B64C 9/02* (2013.01); *B64C 9/14* (2013.01); *B64C 2009/005* (2013.01)

(58) Field of Classification Search
CPC ..................... B64C 9/02; B64C 2009/143
See application file for complete search history.

(56) References Cited

U.S. PATENT DOCUMENTS

| | | | | |
|---|---|---|---|---|
| 4,645,217 A * | 2/1987 | Honeycutt, Jr. | ...... | F01D 11/005 277/555 |
| 5,657,998 A * | 8/1997 | Dinc | ...... | F01D 11/005 277/653 |
| 5,706,648 A * | 1/1998 | Porte | ...... | F02C 7/28 244/54 |
| 5,913,494 A * | 6/1999 | Burbridge | ...... | B64C 9/02 244/130 |
| 6,883,806 B2 * | 4/2005 | Guzzardo | ...... | B64C 3/50 277/628 |
| 7,963,038 B2 * | 6/2011 | Schmitz | ...... | B64C 9/02 29/897.2 |
| 9,550,559 B1 * | 1/2017 | Droney | ...... | B64C 9/18 |
| 9,623,955 B2 * | 4/2017 | Trautmann | ...... | B64C 1/00 |
| 9,688,384 B1 * | 6/2017 | Balzer | ...... | B64C 7/00 |
| 2003/0057659 A1 * | 3/2003 | Guzzardo | ...... | B64C 3/50 277/628 |
| 2015/0353188 A1 * | 12/2015 | Jamison | ...... | B64C 13/24 244/215 |
| 2018/0236858 A1 * | 8/2018 | Lunn | ...... | B60J 10/88 |

* cited by examiner

*Primary Examiner* — Joseph W Sanderson
(74) *Attorney, Agent, or Firm* — Tarolli, Sundheim, Covell & Tummino LLP

(57) ABSTRACT

A blade seal for covering an interface between first and second components of an aircraft includes a mounting portion extending in a longitudinal first direction for connection to the first component. A contact portion maintains contact with the second component. A plurality of pockets positioned along the first direction are separated by projections extending in a second direction perpendicular to the length. Each pocket has a variable depth and facing the second component.

23 Claims, 9 Drawing Sheets

AIRCRAFT BLADE SEAL

TECHNICAL FIELD

The present invention relates generally to aircraft and, more specifically relates to a blade seal for an aircraft.

BACKGROUND

Aircraft blade seals help provide a continuous surface across the gap between the airplane control surface and the adjoining structure. The loft of the aircraft, however, can create a compound curvature in the blade seal surface, which renders the blade seal prone to porting and degraded performance.

SUMMARY

In accordance with one embodiment of the present invention, a blade seal for covering an interface between first and second components of an aircraft includes a mounting portion extending in a longitudinal first direction for connection to the first component. A contact portion maintains contact with the second component. A plurality of pockets positioned along the first direction are separated by projections extending in a second direction perpendicular to the length. Each pocket has a variable depth and faces the second component.

Another embodiment of the invention includes a blade seal for covering an interface between first and second components of an aircraft. The blade seal includes a mounting portion extending in a longitudinal first direction for connection to the first component. A contact portion maintains contact with the second component. A plurality of pockets positioned along the first direction and separated by trapezoidal projections extending in a second direction perpendicular to the first direction. Each pocket has a variable depth and is defined by a wall extending transversely between first and second surfaces of the blade seal. Each pocket faces the second component.

Other objects and advantages and a fuller understanding of the invention will be had from the following detailed description and the accompanying drawings.

DETAILED DESCRIPTION

Figure 1:
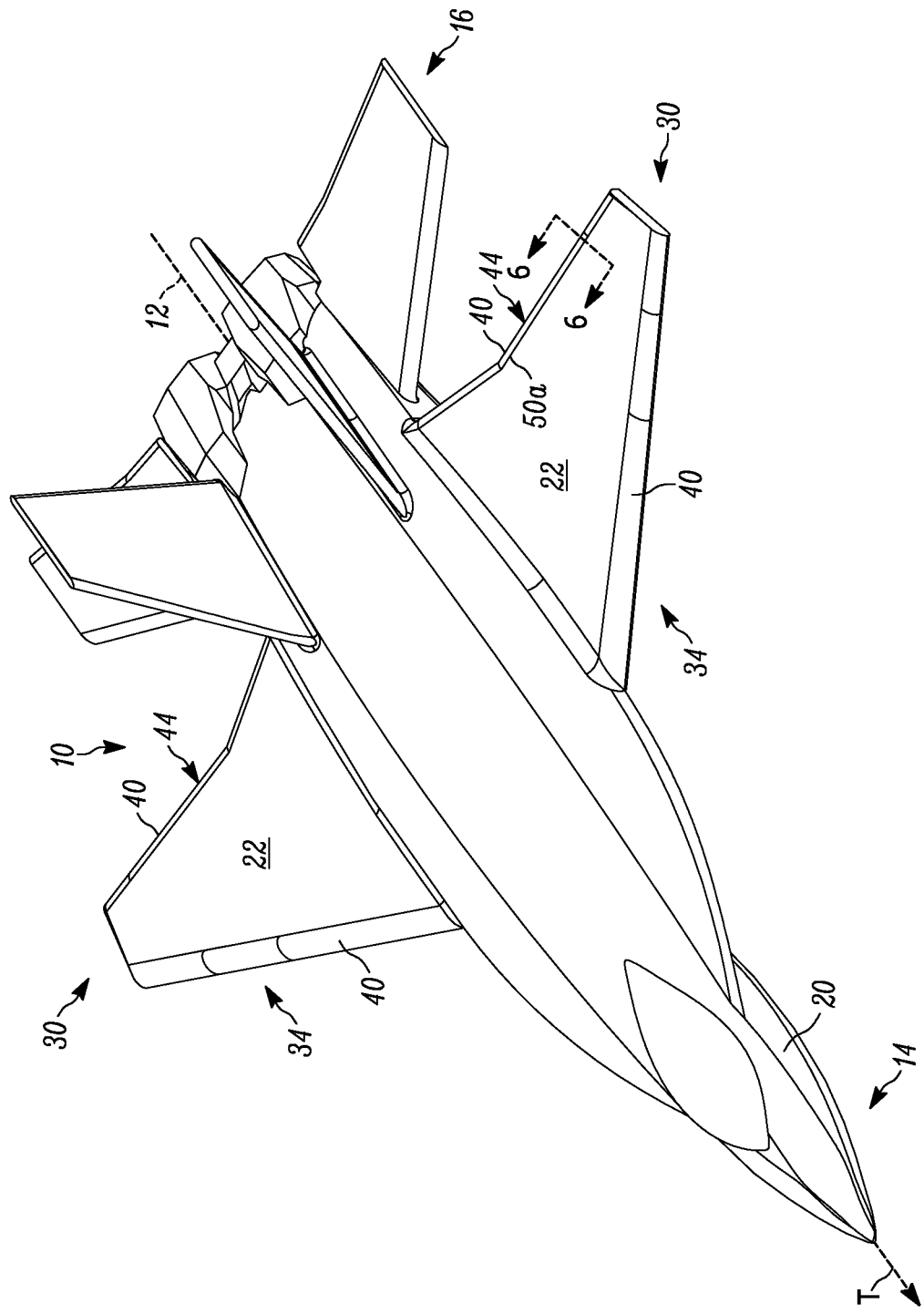
FIG. 1 illustrates an aircraft including an aileron and example blade seal.

The present invention relates generally to aircraft and, more specifically relates to a blade seal for an aircraft. FIGS. 1-8 illustrate an aircraft 10 including an example blade seal 50 in accordance with the present invention. Referring to FIG. 1, the aircraft 10 constitutes a fixed wing plane, e.g., low observable aircraft, and extends generally along a centerline 12 from a first or fore end 14 or a second or aft end 16. The centerline 12 extends along a direction of travel, indicated by the arrow T, of the aircraft 10.

The aircraft 10 includes a fuselage 20 extending generally along the centerline 12. A pair of fixed wings 22 extends from the fuselage 20 on opposite sides of the centerline 12. Each wing 22 includes an end or wing tip 30 spaced from the fuselage 20. One or more ailerons 40 are provided on each wing 22.

Figure 2:
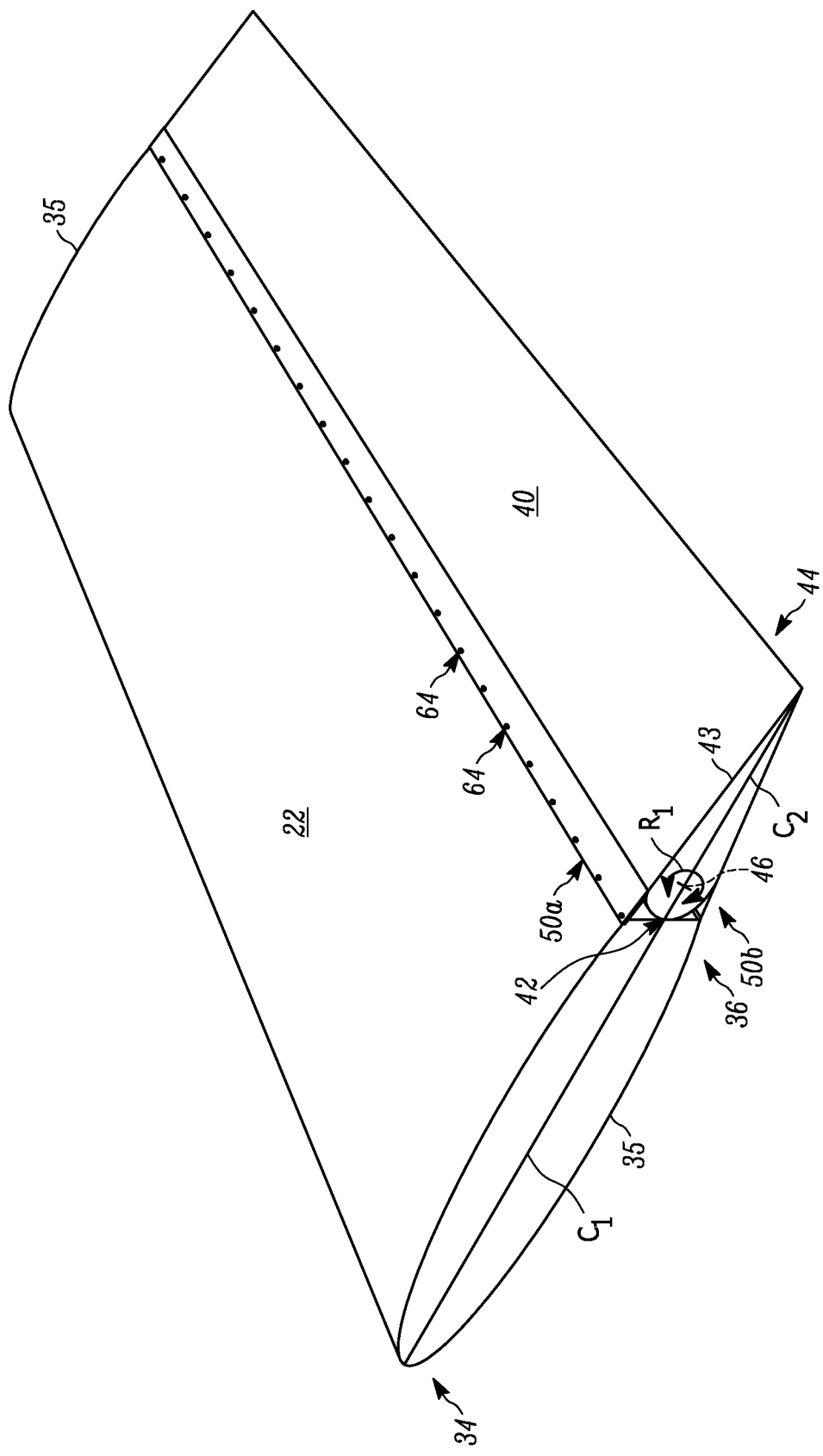
FIG. 2 is a side view of a portion of wing of the aircraft of FIG. 1.

Referring to FIG. 2, the wing 22 has a generally airfoil-shaped cross-section including an upstream, leading end 34 and a downstream, trailing end 36. In one example, the airfoil shape is generally rounded at the leading end 34 and truncated/planar at the trailing end 36. The wing 22 has a chord $C_1$ extending between the leading end 34 and the trailing end 36.

The trailing end 36 of the wing 22 includes one or more ailerons 40 (see also FIG. 1) for controlling the roll and lateral balance of the aircraft 20 about the centerline 12. Referring to FIG. 2, the aileron 40 has an airfoil shape and includes a round or curved leading end 42 and a tapered trailing end 44. A chord $C_2$ extends between the leading end 42 and the trailing end 44. A tapered middle portion 43 is positioned between the leading end 42 and trailing end 44.

The outer contour of the aileron 40 is configured to mimic the natural extension of the truncated trailing end 36 of the wing 22. In other words, the wing 22 and aileron 40 cooperate to define a completed airfoil shape. The leading end 42 is pivotably connected to the trailing end 36 of the wing 22 such that the aileron 40 is pivotable relative to the wing 22 about an axis 46 in the general directions $R_1$ to roll the aircraft 10. It will be understood that the left wing 22 is illustrated in FIG. 2 and that the right wing 22 has the same shape, size, and cross-section as the left wing and is similarly pivotably connected to one or more ailerons 40.

A pair of blade seals 50a, 50b is provided on upper and lower surfaces of the trailing end 36 of the wing 22 adjacent the aileron 40. It will be appreciated that although the blade seals 50a, 50b described herein are shown in connection with a generic aileron of an aircraft it will be appreciated that the blade seals could alternatively or additionally be used with an control surface of an aircraft, e.g., inboard ailerons, outboard ailerons, inboard flaps, outboard flaps, elevators, elevons, tailerons, rudders, etc., and therefore can be used not only on an aircraft wing but also on the horizontal tail, canard, and vertical tail.

The blade seals 50a, 50b are substantially identical to one another and help seal the interface between the aileron 40 and the wing 22 during relative movement in flight. In other words, the blade seals 50a, 50b help maintain smooth relative movement between the aileron 40 and wing 22 about the axis 46. The wing 22, blade seals 50a, 50b, and aileron 40 collectively define the outer mold line (OML) 35 for portions of the wing. When reference character 50 is used hereafter it will be understood that the description is directed to each blade seal 50a, 50b.

Figure 3:
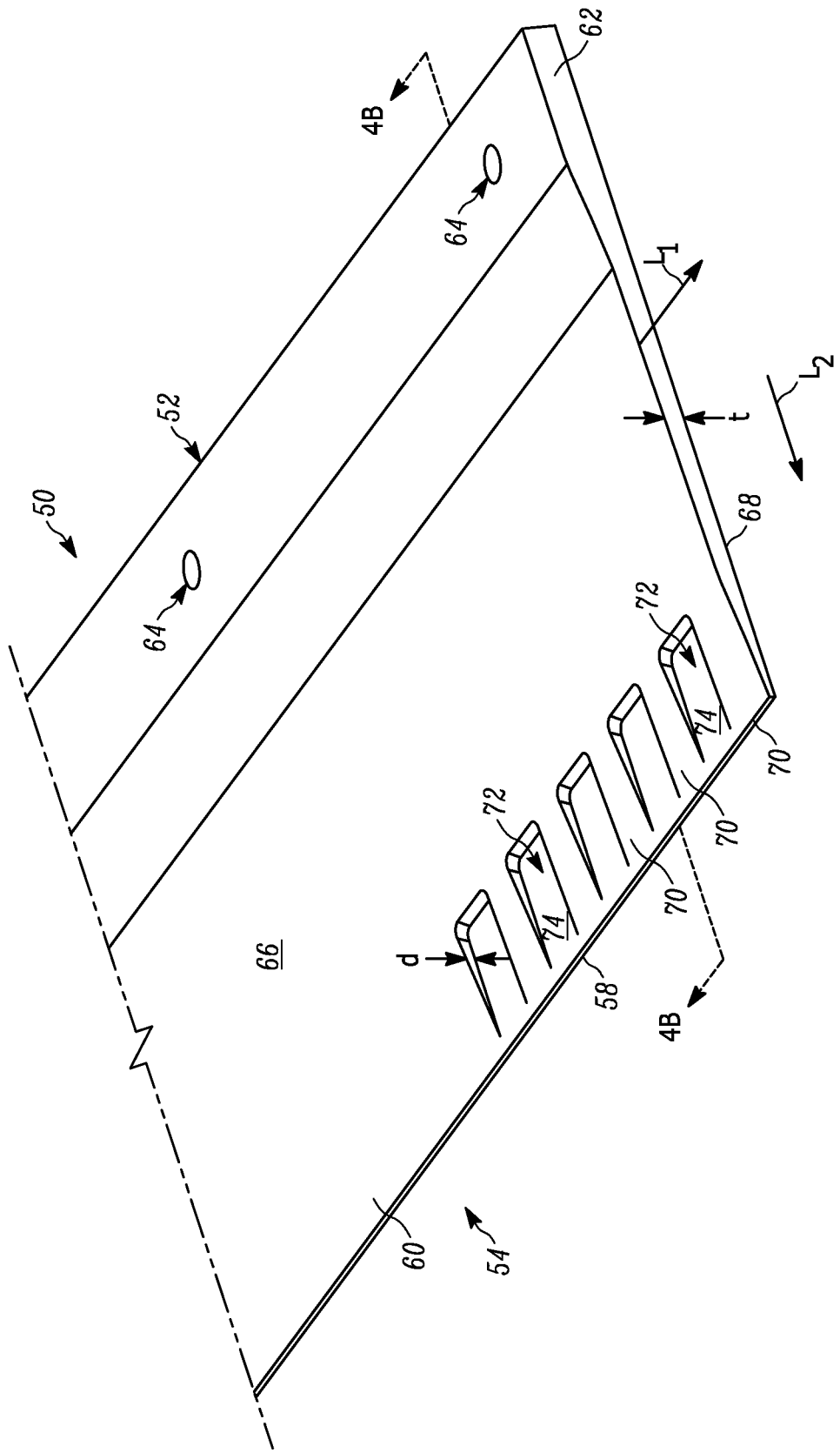
FIG. 3 is a view of a portion of the blade seal of FIG. 1 that faces the control.

Referring to FIG. 3, the blade seal 50 has a generally elongated, rectangular shape extending lengthwise in a longitudinal direction $L_1$. The blade seal 50 also extends widthwise from a leading end 52 to a trailing end 54 in a direction $L_2$ generally perpendicular to the longitudinal direction $L_1$. The trailing end 54 terminates at an end surface 58. The blade seal 50 includes a mounting portion 62 at the leading end 52 and a contact portion 60 at the trailing end 54. A plurality of openings 64 extends through the mounting portion 62 and are aligned along the longitudinal direction $L_1$. The openings 64 receive fasteners (not shown) to secure the mounting portion 62 to the trailing end 36 of the wing 22.

Figure 4A:
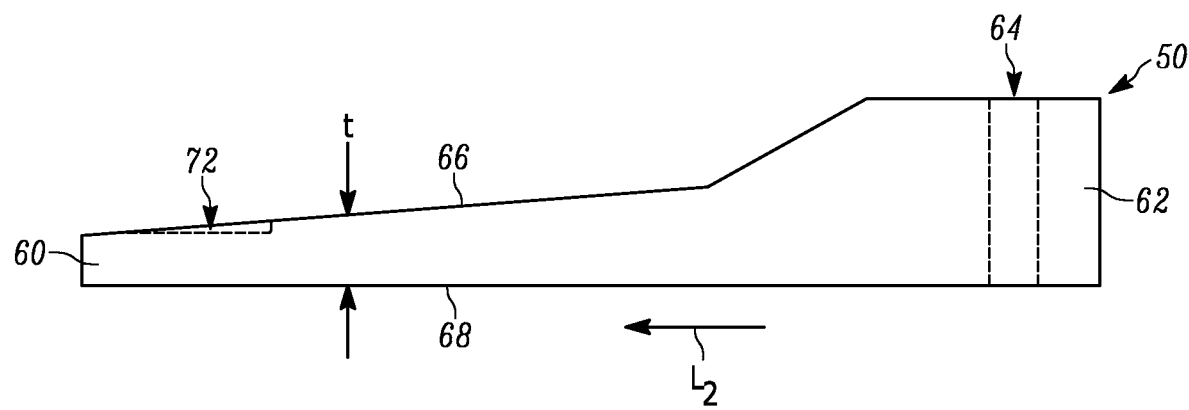
FIG. 4A is a side view of the blade seal of FIG. 3.
Figure 4B:
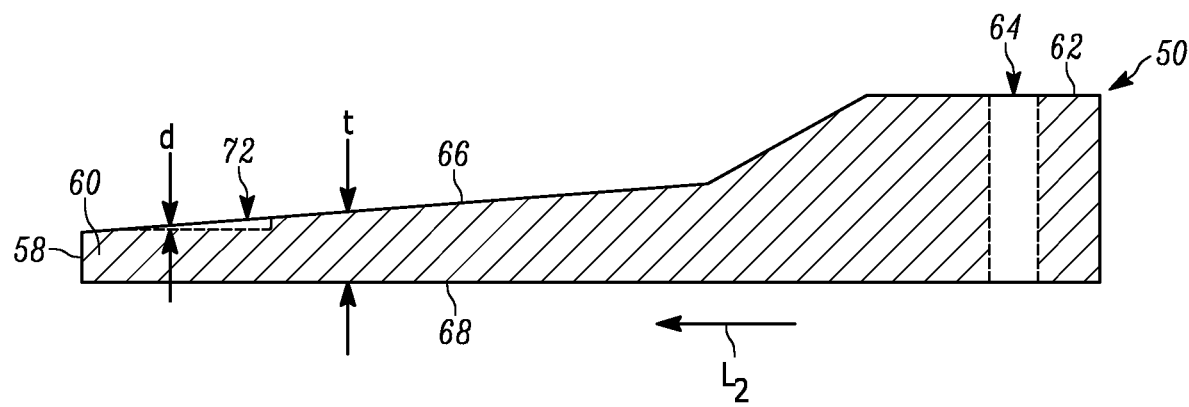
FIG. 4B is a section view of the blade seal of FIG. 3 taken along the line 4B-4B.
Figure 4C:
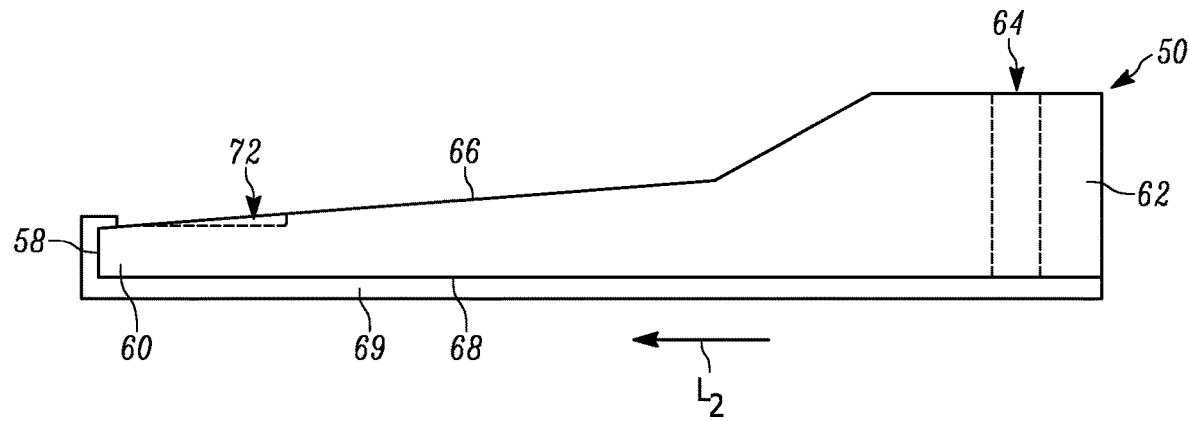
FIG. 4C is a side view of a modified version of the blade seal of FIG. 3.

As further shown in FIGS. 4A-4B, the blade seal 50 includes a first surface 66 and an opposing second surface 68. As illustrated, the surfaces 66, 68 are the inner mold line and OML, respectively. A thickness "t" of the blade seal 50 is measured as the distance between the surfaces 66, 68. The blade seal 50 tapers inward towards the trailing end 54 and, thus, the thickness t decreases in the direction $L_2$. The blade seal 50 is therefore thinnest at the end surface 58.

A series of recesses or pockets 72 is formed in the blade seal 50 along the contact portion 60. Each pocket 72 extends from the first surface 66 towards the second surface 68 and terminates at a surface 74 spaced from the second surface. A depth "d" of the pocket 72 decreases in the direction $L_2$ until the depth reaches zero adjacent the end surface 58 (see FIG. 4B).

Figure 5:
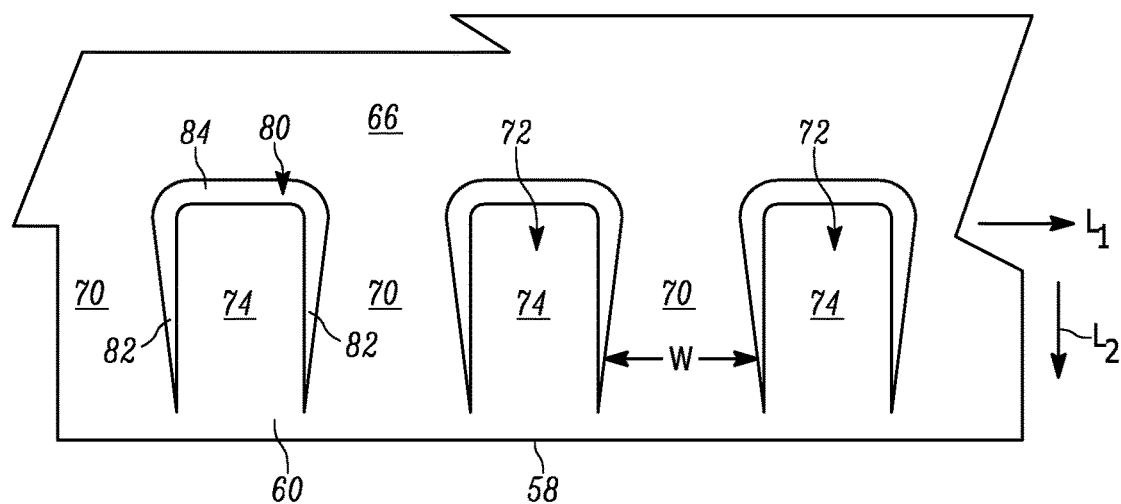
FIG. 5 is a view of a portion of the blade seal of FIG. 3 that faces the control.

Each pocket 72 is generally rectangular and bounded by a wall 80 having a pair of legs 82 and a member 84 connecting the legs (FIG. 5). Each leg 82 extends from the first surface 66 to the surface 74 and is angled, e.g., extends transverse (as shown) or perpendicular (not shown), relative to the surfaces 66, 74. Similarly, the connecting member 84 extends from the first surface 66 to the surface 74 and is angled, e.g., extends transverse (as shown) or perpendicular (not shown), relative to the surfaces 66, 74. Collectively, the legs 82 and connecting member 84 define a substantially U-shaped wall 80.

The pockets 72 are spaced from one another in the longitudinal direction $L_1$ by projections or fingers 70. The projections 70 have a trapezoidal shape when viewed from above (see FIG. 5) in which the width "w" increases in the direction $L_2$. The projections 70 are therefore widest at the end closest to the end surface 58. The projections 70 could alternatively be rectangular (not shown). In any case, the projections 70 extend in the direction $L_2$ and terminate prior to the end surface 58. Alternatively, the projections 70 can extend to the end surface 58 and, thus, the pockets 72 can extend to the trailing edge 58. The pockets 72 can be the same as one another or different from one another in the direction $L_1$. In any case, the pockets 72 are neither filled nor covered by another material or structure on the blade seal 50. In other words, the walls 80 and surfaces 74 defining the pockets 72 are uncovered/exposed to their surroundings.

The blade seal 50 can be formed from any metal, polymer, plastic, composite, e.g., Fibermat®, or combination thereof suitable for aircraft flight and controlling aircraft roll about the centerline 12 without plastic deformation. In an example in which the blade seal 50 is formed from a composite surface ply 69 (see FIG. 4C) extends from the surface 66 at the contact portion 60, around the trailing edge 58, and along the entire surface 68. In an example in which the blade seal 50 is formed from metal, no Fibermat® surface ply or overlay is needed. It will be appreciated that the pockets 72 are not covered by the surface ply 69 when the surface ply is included, i.e., the pockets remain uncovered/exposed.

Figure 6:
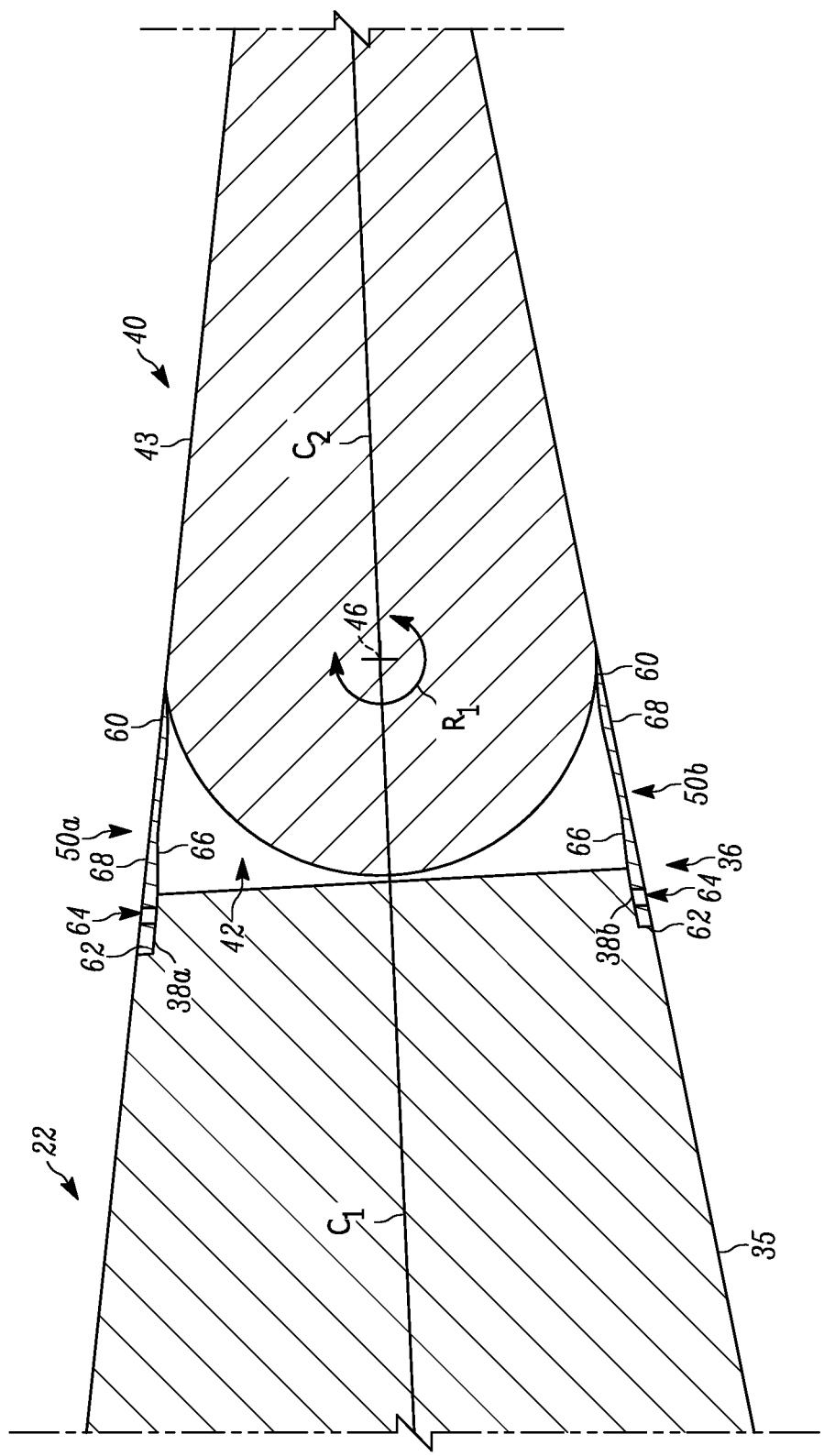
FIG. 6 is a section view of the wing of FIG. 1 with the aileron in a first condition.

Referring to FIG. 6, the pair of blade seals 50a, 50b are positioned on opposite sides of the aileron 40. The mounting portion 62 of the blade seal 50a is received in a first recess 38a extending along the length of the wing 22. Fasteners (not shown) extend through the openings 64 in the mounting portion 62 to rigidly secure the mounting portion 62 of the blade seal 50a to the trailing end 36 of the wing 22. The blade seal 50a is secured to the wing 22 with the second surface 68 facing outward and the first surface 66 facing inward. Consequently, the pockets 72 of the blade seal 50a face inward towards the aileron 40 and therefore are not exposed to air flow.

The mounting portion 62 of the blade seal 50b is received in a second recess 38b extending along the length of the wing 22. Fasteners (not shown) extend through the openings 64 in the mounting portion 62 to rigidly secure the blade seal 50b to the trailing end 36 of the wing 22. The blade seal 50b is secured to the wing 22 with the second surface 68 facing inward and the second surface 68 facing outward. Consequently, the pockets 72 of the blade seal 50b face inward towards the aileron 40 and therefore are not exposed to air flow. With this configuration, the first surfaces 66 of the blade seals 50a, 50b face one another and the second surfaces 68 face in opposite directions from one another.

Once secured to the wing 22, the contact portion 60 of each blade seal 50a, 50b abuts the curved leading end 42 of the aileron 40. As shown in FIG. 6, during level flight, the chords $C_1$, $C_2$ of the wing 22 and the aileron 40 are coextensive, i.e., they are not angled relative to one another. The contact portion 60 maintains a seal along the interface between the wing 22 and the aileron 40 and, in this position, helps form an outer mold line (OML) with an airfoil shape.

Figure 7:
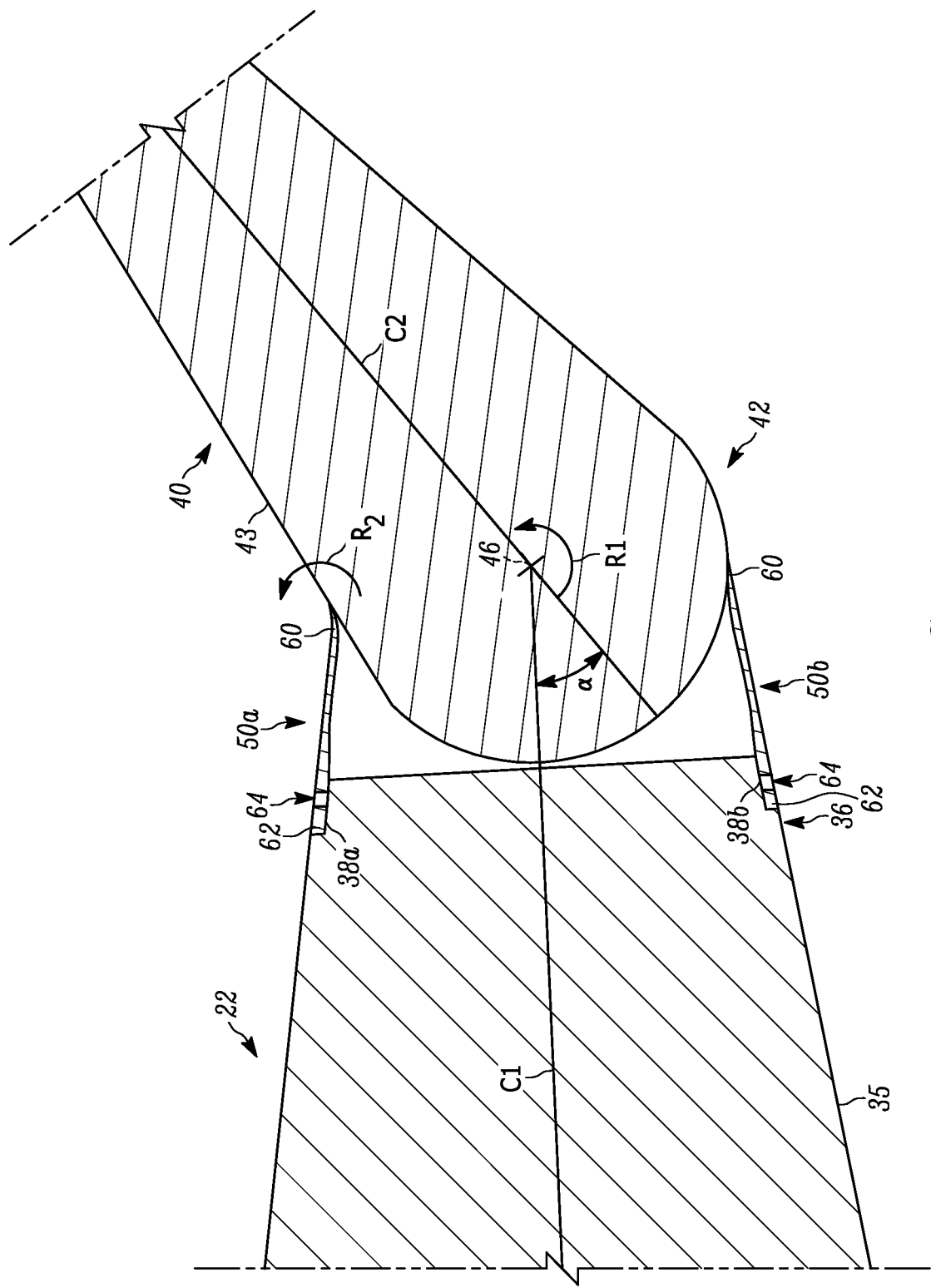
FIG. 7 is a section view of the wing of FIG. 2 with the aileron in a second condition.

When it is desirable to control the roll of the aircraft 10 about the centerline 12, one or more actuators or motors (not shown) on the aircraft pivot the aileron 40 about the axis 46 relative to the wing 22 in the directions $R_1$. FIG. 7 shows one example in which the aileron 40 is rotated about the axis 46 in the counterclockwise direction $R_1$. This rotation $R_1$ creates an angle α between the chords $C_1$, $C_2$ and tilts the aileron 40 upwards relative to the wing 22. Since FIG. 7 illustrates the left wing 22, it will be understood that the aileron 40 on the right wing 22 could alternatively or additionally will be pivoted about its axis 46 in the opposite direction to tilt the aileron downwards relative to the right wing. Pivoting either/both ailerons 40 in these manners will cause the aircraft 10 to roll left about the centerline 22, i.e., in a counterclockwise direction when looking in the direction of travel T (see FIG. 1).

It will also be appreciated that if the rotation directions of the ailerons 40 on each wing 22 are reversed, i.e., the aileron on the left wing tilted downwards and the aileron on the right wing tilted upwards, the aircraft 10 would roll right about the centerline 22, i.e., in a clockwise direction when looking in the direction of travel T.

In both cases, the blade seals 50 are configured to maintain contact with the curved aileron 40 to provide a constant seal between the aileron/wing 22 interface. This prevents debris from entering the interface and ensures a smooth, continuous OML 35. To this end, the configuration of the pockets 72 and projections 70 provides the blade seal 50 with advantageous mechanical properties. More specifically, the pockets 72 reduce the stiffness of the blade seal 50 along the contact portion 60 in the longitudinal direction $L_1$. As a result, the contact portion 60 of the blade seal 50 can readily deflect/elastically deform to maintain contact with the moving aileron 40, thereby helping maintain a better seal between the moving aileron and the wing 22 (see FIG. 7).

Moreover, positioning the blade seals 50a, 50b such that the pockets 72 face the aileron 40 [and therefore are not exposed to air flow] prevents the air flow from acting on the blade seals in a manner that attempts to lift the blade seals off the aileron during flight and aileron operation.

To this end, when the aileron 40 rotates in the counter-clockwise direction $R_1$ the contact portion 60 on the blade seal 50a initially slides along the curved leading end 42. Once the contact portion 60 slides onto the tapered middle portion 43, the change in geometry from the curved leading end 42 causes the contact portion to deflect/elastically deform in the direction $R_2$. Since the blade seal 50b maintains contact with the curved leading end 42 no deflection of its contact portion 60 occurs when the aileron 40 pivots in the counterclockwise direction $R_1$.

Similarly, when the aileron 40 rotates in the clockwise direction (not shown) the opposite effect occurs. More specifically, the contact portion 60 on the blade seal 50b initially slides along the curved leading end 42 but deflects upon reaching the middle portion 43. The blade seal 50a maintains contact with the curved leading end 42 throughout clockwise rotation of the aileron 40 and, thus, no deflection of its contact portion 60 occurs.

In all instances, the projections 70 provide stiffness to the blade seals 50a, 50b in the direction $L_2$. Consequently, the deflected contact portions 60 of the blade seals 50a, 50b are mechanically biased into engagement with the curved leading end 42 of the aileron 40. The projections 70 can therefore be specifically tailored depending on the engagement profile between the blade seals 50a, 50b and curved aileron 40. Due to this configuration, the blade seals 50a, 50b are advantageously tolerant of compound curvature lofts and help ensure the interface between the wing 22 and aileron 40 remains sealed over the entire range of motion of the aileron relative to the wing in either direction $R_1$.

Moreover, due to the increased blade seal 50a, 50b flexibility in the longitudinal direction $L_1$, the force needed by the actuator/motor to rotate the aileron 40 in either direction $R_1$, $R_2$ is reduced. In other words, the flexible blade seals 50a, 50b provide less resistance to pivotal movement of the ailerons 40 than blade seals which are not provided with reduced stiffness in the longitudinal direction.

Figure 8:
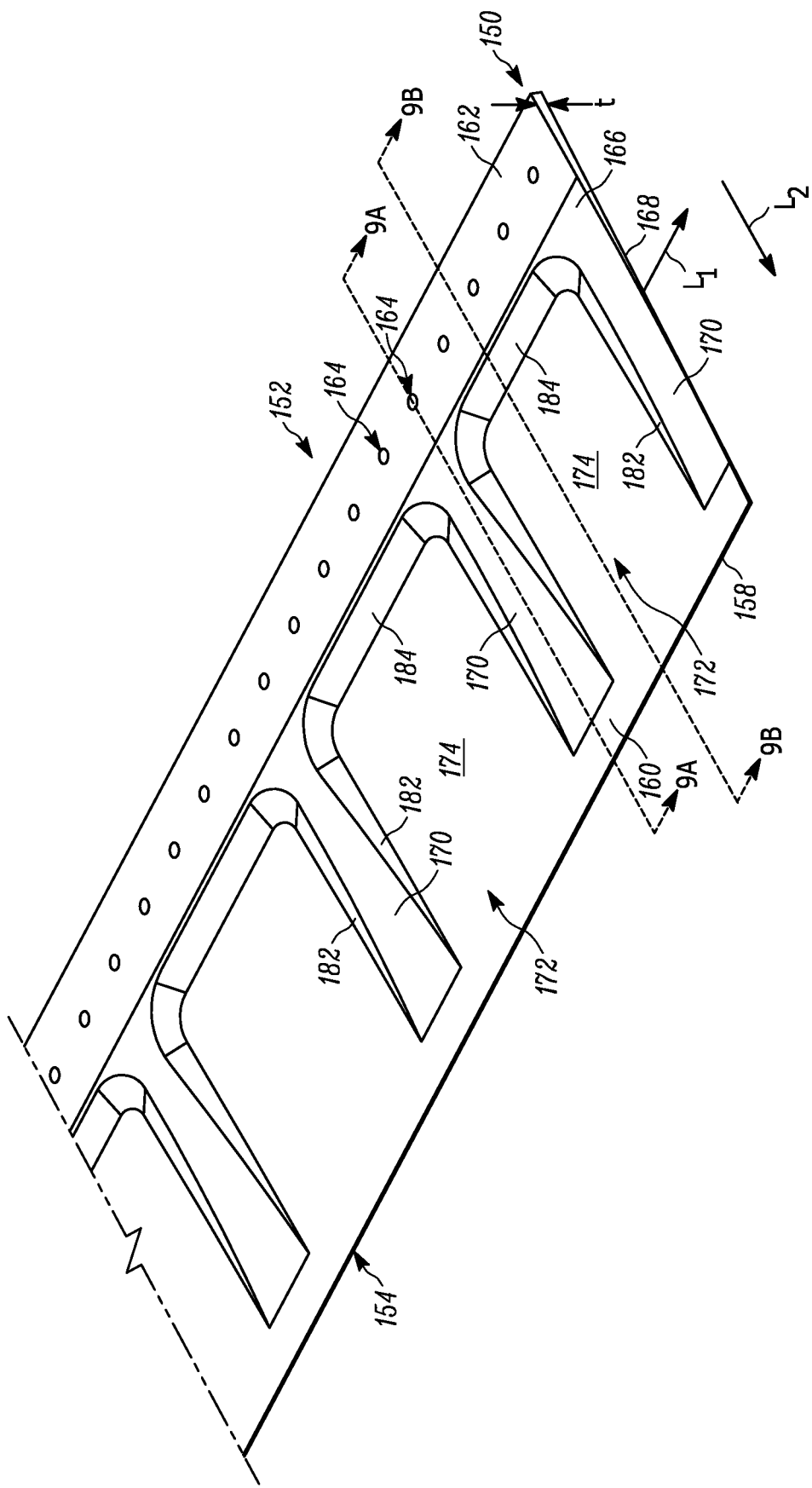
FIG. 8 is a view of a portion of another example blade seal that faces the control.
Figure 9A:
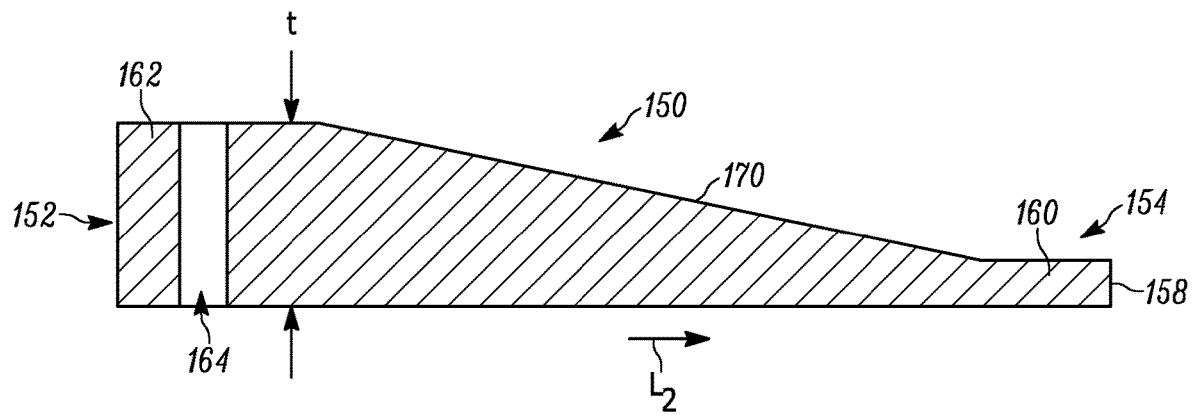
FIG. 9A is a section view of the blade seal of FIG. 8 taken alone line 9A-9A.
Figure 9B:
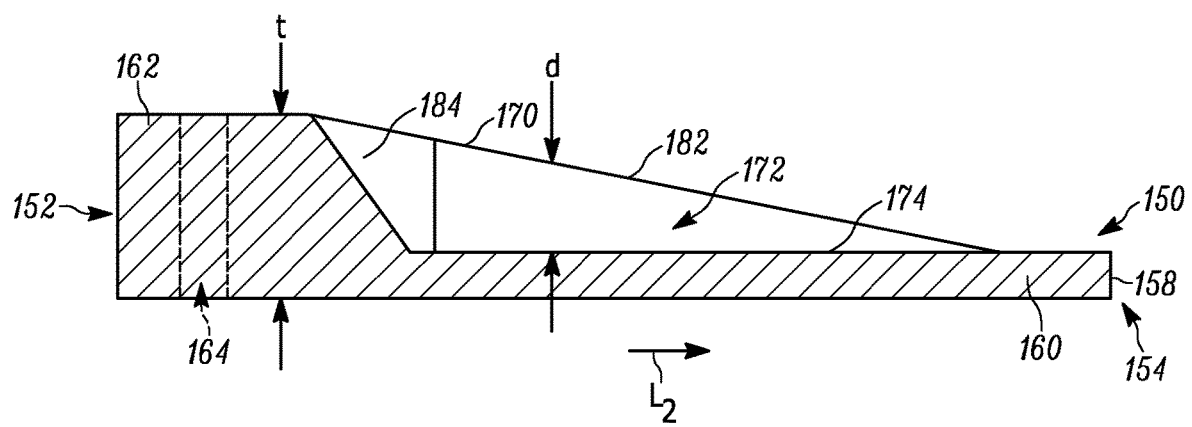
FIG. 9B is a section view of the blade seal of FIG. 8 taken along line 9B-9B.

FIGS. 8-9B illustrate another example blade seal 150 in accordance with the present invention. Features of the blade seal 150 that are similar to the features of the blade seal 50 are given reference numbers 100 greater than the corresponding feature on the blade seal 50. It will be appreciated that, like the blade seals 50a, 50b, a pair of blade seals 150 will be secured to opposite sides of the trailing end 36 of the wing 22 and in contact with the leading end 42 of the aileron 40 (not shown).

Referring to FIG. 8, the pockets 172 on the blade seal 150 are larger than the pockets 72 of the blade seal 50. More specifically, the projections 170 extend in the direction $L_2$ from the mounting portion 162 to the contact portion 160. The connecting portions 184 are therefore positioned closer to the openings 164 than the connecting portions 84 are positioned relative to the openings 64. Consequently, the projections 170 have a greater length in the direction $L_2$ than the length of the projections 70 in the same direction.

As further shown in FIG. 9B, the blade seal 150 is wedge-shaped and has a thickness t that continuously decreases from the leading end 152 to the trailing end 154. The depth d of each pocket 174 also continuously decreases in the direction $L_2$. The walls 180 and surfaces 174 defining the pockets 172 are uncovered/exposed to their surroundings. That said, the blade seal 150 functions in the same manner as the blade seal 50 and, thus, the pair of blade seals 150a, 150b deflect in the same manner as blade seals 50a, 50b to maintain a seal along the interface between the moving aileron 40 and the wing 22. The projections 170 and pockets 172 on the blade seal 150 can be specifically tailored depending on the configuration of the curved leading end 42 of the aileron 40 to exhibit a desired bending stiffness.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A blade seal for covering an interface between first and second components of an aircraft, the blade seal comprising:
   a mounting portion extending in a longitudinal first direction for connection to the first component;
   a contact portion for maintaining contact with the second component; and
   a plurality of pockets positioned along the first direction and separated by projections extending in a second direction perpendicular to the first direction, each pocket having a non-uniform depth and being defined by a non-vertical wall having legs that taper inwards such that a width of each leg in the first direction decreases in the second direction.

2. The blade seal recited in claim 1, wherein the mounting portion is configured for connection the first component comprising an aircraft wing and the contact portion is configured for maintaining contact with the second component comprising an aileron.

3. The blade seal recited in claim 1, wherein the mounting portion is configured for connection the first component comprising an aircraft wing and the contact portion is configured for maintaining contact with the second component comprising a flap.

4. The blade seal recited in claim 1, wherein the projections are trapezoidal.

5. The blade seal recited in claim 1, wherein the projections have a thickness that decreases in the second direction.

6. The blade seal recited in claim 1, wherein the depth of each pocket is defined between first and second surfaces, the wall extending transverse to the first and second surfaces such that the wall faces away from the second surface.

7. The blade seal recited in claim 6, wherein the pockets have a uniform width in the first direction at the second surface.

8. The blade seal recited in claim 1, wherein each of the projections has a width in the first direction that increases along the second direction.

9. The blade seal recited in claim 1, wherein wall is U-shaped, the pair of legs extends in the second direction and a connecting portion extends in the first direction.

10. The blade seal recited in claim 1, wherein the blade seal includes opposing first and second surfaces, the depth of each pocket being defined from the first surface to a third surface between the first and second surfaces and being non-uniform in the second direction.

11. The blade seal recited in claim 1, wherein the projections extend to the mounting portion.

12. The blade seal recited in claim 1, wherein the contact portion elastically deflects relative to the mounting portion in response to relative movement between the first and second components.

13. The blade seal recited in claim 1, wherein all the pockets are exposed.

14. The blade seal recited in claim 1, wherein the depth is along a third direction perpendicular to the first and second directions.

15. The blade seal recited in claim 1, wherein the wall faces the second component.

16. A blade seal for covering an interface between first and second components of an aircraft, the blade seal comprising:
- a mounting portion extending in a longitudinal first direction for connection to the first component;
- a contact portion for maintaining contact with the second component; and
- a plurality of pockets positioned along the first direction and separated by trapezoidal projections extending in a second direction perpendicular to the first direction, each pocket having a non-uniform depth and being defined by a non-vertical wall extending transversely between first and second surfaces of the blade seal, each pocket and each wall facing the second component.

17. The blade seal recited in claim 16, wherein the mounting portion is configured for connection the first component comprising an aircraft wing and the contact portion is configured for maintaining contact with the second component comprising an aileron.

18. The blade seal recited in claim 16, wherein the mounting portion is configured for connection the first component comprising an aircraft wing and the contact portion is configured for maintaining contact with the second component comprising a flap.

19. The blade seal recited in claim 16, wherein the wall is U-shaped and includes a pair of legs extending in the second direction and a connecting portion extending in the first direction.

20. The blade seal recited in claim 16, wherein the projections extend to the mounting portion.

21. The blade seal recited in claim 16, wherein the contact portion elastically deflects relative to the mounting portion in response to relative movement between the first and second components.

22. The blade seal recited in claim 16, wherein all the pockets are exposed.

23. The blade seal recited in claim 16, wherein the pockets have a uniform width in the first direction at the second surface.

* * * * *